United States Patent
Adams et al.

[11] Patent Number: 5,862,650
[45] Date of Patent: Jan. 26, 1999

[54] METHOD FOR REMOVING OBJECTS FROM A TRANSPORTATION OR STORAGE CONTAINER

[75] Inventors: Paul S. Adams, Saline, Mich.; John A. Gentle, Toledo, Ohio

[73] Assignee: Owens Corning Fiberglas Technology, Inc., Summit, Ill.

[21] Appl. No.: 865,465

[22] Filed: May 29, 1997

[51] Int. Cl.⁶ ..................................................... B65B 1/04
[52] U.S. Cl. .............................. 53/473; 53/390; 294/81.6; 294/82.36; 414/661
[58] Field of Search ............................. 294/81.6, 28.36; 53/390, 393, 473; 414/467, 592, 607, 661, 796.5; 254/DIG. 14

[56] References Cited

U.S. PATENT DOCUMENTS

| | | | |
|---|---|---|---|
| 1,644,904 | 10/1927 | West | 254/DIG. 14 |
| 2,655,323 | 10/1953 | Wiggan | 414/467 |
| 3,413,027 | 11/1968 | Bohlin et al. | 294/81.6 |
| 3,724,685 | 4/1973 | Bevan | 414/796.5 |
| 4,022,507 | 5/1977 | Marino . | |
| 4,026,592 | 5/1977 | Powers | 294/81.6 |
| 4,181,342 | 1/1980 | Funk | 294/81.6 |
| 5,022,316 | 6/1991 | Hellwig | 53/390 |
| 5,230,588 | 7/1993 | Wittke et al. | 254/DIG. 14 |
| 5,255,947 | 10/1993 | Schwartz . | |
| 5,350,063 | 9/1994 | Berdan . | |
| 5,401,070 | 3/1995 | LePelley . | |
| 5,503,517 | 4/1996 | Derby | 53/473 |
| 5,513,944 | 5/1996 | Cullen et al. | 414/607 |
| 5,515,664 | 5/1996 | Tanaka et al. | 53/473 |
| 5,538,302 | 7/1996 | Travis . | |
| 5,704,669 | 1/1998 | Clark | 294/24 |

Primary Examiner—James F. Coan
Assistant Examiner—Eugene L. Kim
Attorney, Agent, or Firm—C. Michael Gegenheimer; Curtis B. Brueske

[57] ABSTRACT

A method of placing compressed insulation material into a container for subsequent removal includes selecting a group of packages of compressed insulation material to be put into the container, attaching a line to the group, where the line is attached substantially at the top of the group so that at least an upper segment of the group can be pulled out of the container by pulling the line and tipping over the upper segment, and placing the group into the container.

16 Claims, 3 Drawing Sheets

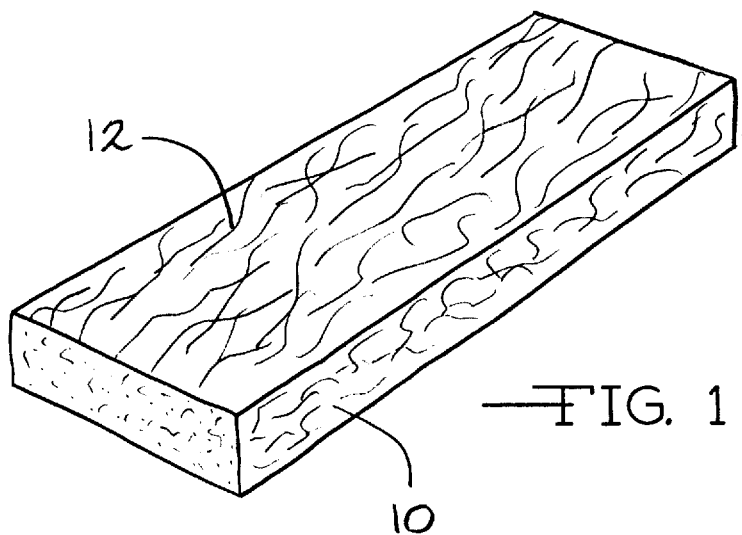
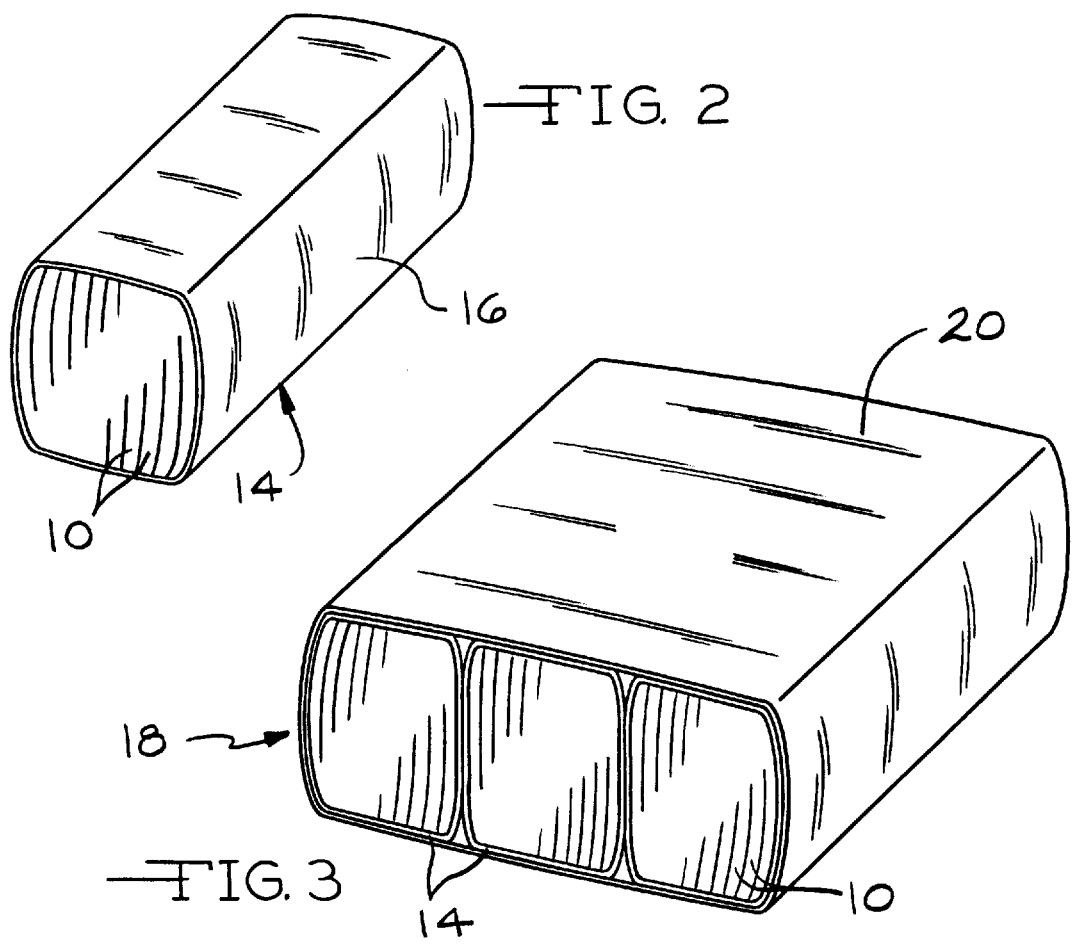

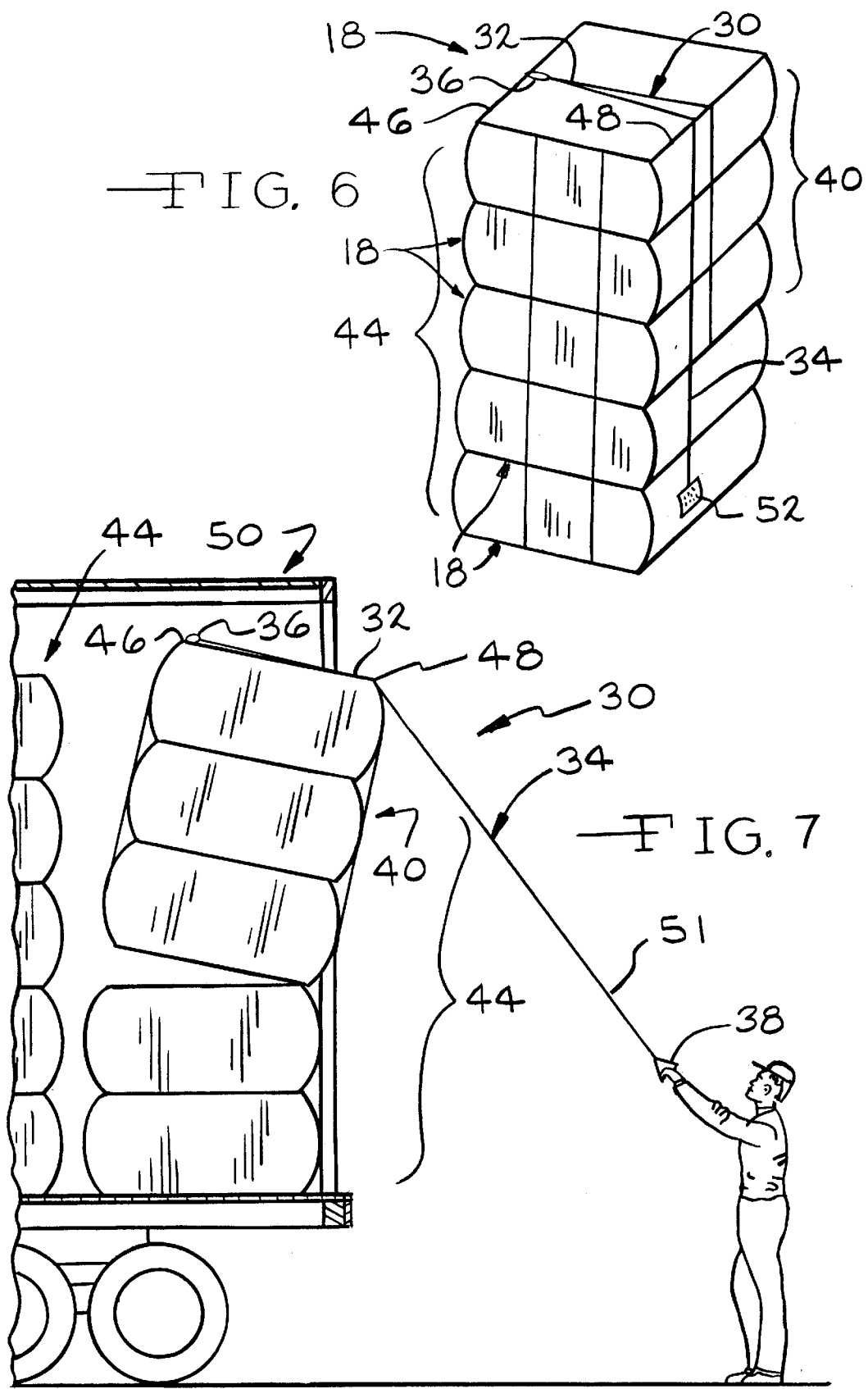

METHOD FOR REMOVING OBJECTS FROM A TRANSPORTATION OR STORAGE CONTAINER

TECHNICAL FIELD AND INDUSTRIAL APPLICABILITY OF THE INVENTION

This invention relates to a method for placing and removing objects from a transportation or storage container, such as a truck. More particularly, this invention pertains to using elongated pulling materials such as ropes, straps or webs, to enable a person to remove a heavy or bulky object, such as large packages of glass fiber insulation batts, while being at a substantial distance from the large object. This invention is particularly useful in loading and unloading large, bulky packages of compressed insulation batts from transportation and storage containers or vehicles.

BACKGROUND OF THE INVENTION

The transportation and storage of large or heavy objects is carried out in many instances by placing the objects in a truck, railcar or storage container. Fiberglass insulation batts, for example, are highly compressed and packaged in large packages for shipping from a manufacturing facility to a distribution or storage location. Efforts to reduce transportation costs, particularly for a material such as fiberglass insulation batts, have resulted in increased emphasis on larger and larger packages. For a compressible material such as fiberglass insulation, multiple bags of insulation batts are packaged together into a sleeve package for further compression and resulting shipping and storage economies. The increased bulk and weight of these packages present difficulties in manually handling the units and shipping packages. Sleeve packages of insulation material typically weigh 90 to 100 pounds, and can weigh as much as 150 pounds. It is advantageous to design the units and shipping packages to have generally equal face dimensions (i.e., a generally square face) so that the packages can be manually cartwheeled on the ground at the construction or installation site. This is disclosed in U.S. Pat. No. 5,350,063 to Berdan, II.

Some trucks carrying insulation units and shipping packages are unloaded at locations having loading docks, and are unloaded either manually or with the aid of a forklift truck. In some situations, however, trucks and other transportation or storage containers must be unloaded in places where a loading dock is not available. A problem faced by those required to manually unload a semitrailer from the ground is the issue of how to get the first unit or shipping package safely off the truck without climbing up on the potentially unstable load of insulation packages. It is important that the person unloading the truck not be in the path of any of the packages as they tumble to the ground from the truck.

It is known to use a retractable loop on the end of a pole to remove articles from a truck, as evidenced by U.S. Pat. No. 5,538,302 to Travis. The method suggested by this patent includes securing the loop around the article after the article is already positioned inside the truck.

It would be advantageous if a method could be developed to increase the ease with which units and shipping packages of various materials could be effectively removed from a truck or other container without requiring the unloader to climb up on the load of insulation packages. Such a method would also preferably insure that the unloader would be out of the path of the package as the packages tumble to the ground from the truck.

SUMMARY OF THE INVENTION

The above object as well as other objects not specifically enumerated are achieved by a method of placing compressed insulation material into a container for subsequent removal, including selecting a group of packages of compressed insulation material to be put into the container, and attaching a line substantially at the top of the group so that at least an upper segment of the group can be pulled out of the container by pulling the line and tipping over the upper segment.

In another embodiment of the invention, the method includes substantially filling the container with packages of compressed insulation material, selecting a group of from 2 to about 6 packages of compressed insulation material to be the final packages to be put into the container, attaching a line to an upper segment of the group so that the upper segment is held together, where the line is attached to the upper segment substantially at the top of the upper segment so that the upper segment can be pulled out of the container by pulling the line and tipping over the upper segment, placing the group into the container, and closing the container.

In yet another embodiment of the invention, a method of removing packages of compressed insulation material from a container, where the packages are stacked in the container in the form of a group of from 2 to about 6 packages, includes paying out a line attached substantially to the top of the group of packages, and pulling the line to cause at least an upper segment the group to tip over and fall out of the container.

BRIEF DESCRIPTION OF THE DRAWINGS

FIG. 1 is a schematic view in perspective of an insulation batt.

FIG. 2 is a schematic view of an insulation bag of batts.

FIG. 3 is a schematic view of a sleeve package containing three bags of batts.

FIG. 6 shows a group of sleeve packages with the loop portion of the line looped around the upper segment of packages.

FIG. 7 illustrates the removal packages of compressed insulation material from a truck according to the method of the invention.

DETAILED DESCRIPTION AND PREFERRED EMBODIMENTS OF THE INVENTION

Figure 4:
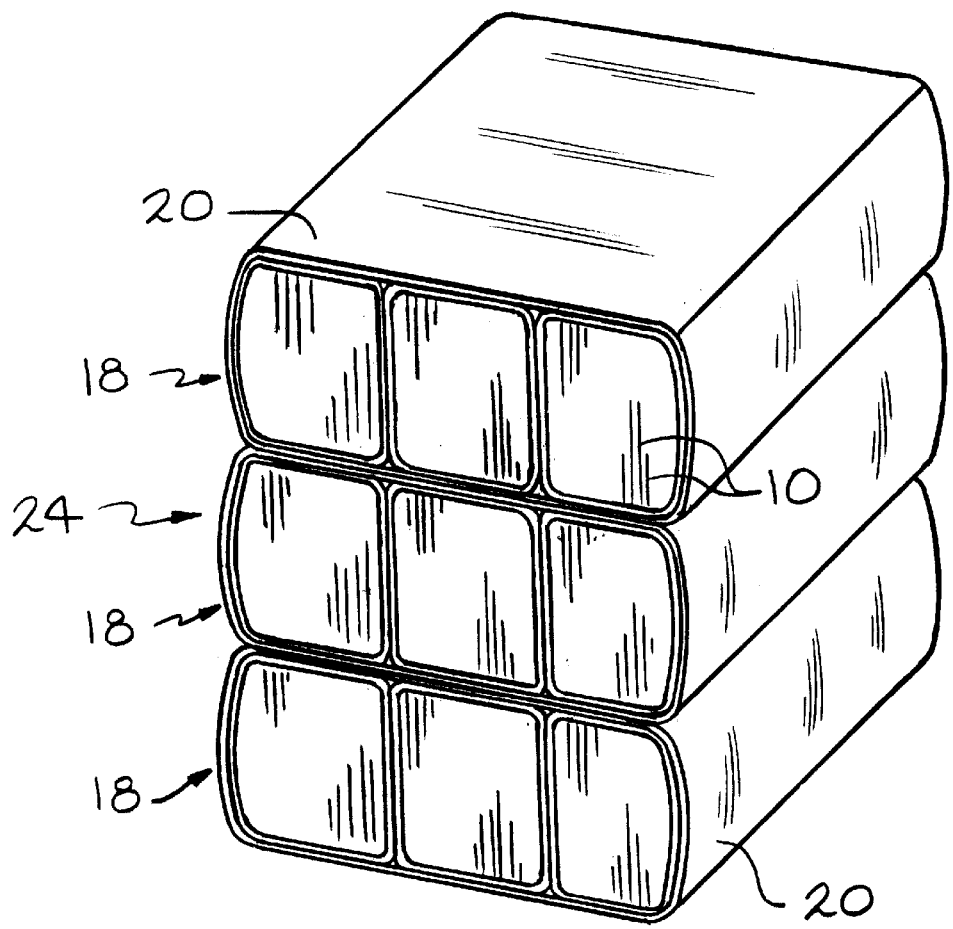
FIG. 4 is schematic view of a stack of three sleeve packages.

The description and drawings disclose packages of compressible fiberglass insulation, with the insulation visible through the end of the package. It is to be understood that the insulation material can be any compressible insulation material, such as rock wool, and that the insulation packages are normally closed to protect the insulation during shipping and storage.

As shown in FIG. 1, insulation batt 10 has major face 12. The insulation batt is made of glass fibers, and has a resiliency enabling it to be compressed during packaging to the extent of a ratio of at least 4:1, with recovery to the full recovery height after the package is opened. Typical glass fiber insulation batts have a density of approximately 0.5 pounds per cubic foot. Batts typically are 4 feet or 8 feet in length. If 8 feet in length, they are usually folded in half prior to packaging.

As shown in FIG. 2, an insulation package or bag 14 of batts is comprised of a collection of batts, with the batts packaged by wrapper 16. The wrapper can be any suitable means for holding the batts in compression. Typically the wrapper is a polyethylene film, with a thickness of about 4 mils, although other materials, such as kraft paper can be used. The batt package has a length of about 49 inches and a width which varies depending upon the number of batts in the package, the thickness of the batts, and the extent of compression of the batts.

As shown in FIG. 3, three bags 14 of batts are formed into a sleeve package 18, held together by sleeve 20. This sleeve can be any means suitable for holding together two or more batt packages. Such sleeves are known in the insulation packaging field, and are typically made of polypropylene. The sleeve package 18 preferably has a generally square face so that the sleeve package can be cartwheeled by the insulation contractor after the sleeve package is delivered to the jobsite. As shown in FIG. 4, three sleeve packages 18 are collected and stacked together as a stack 24. This stack can be held together into a unit by a wrapper, not shown, or by any other means, but the stack is usually not wrapped. It should be understood that any reasonable number of bags 14 can be placed in a sleeve package 18, and any reasonable number of sleeve packages can be stacked together in a stack 24.

Figure 5:
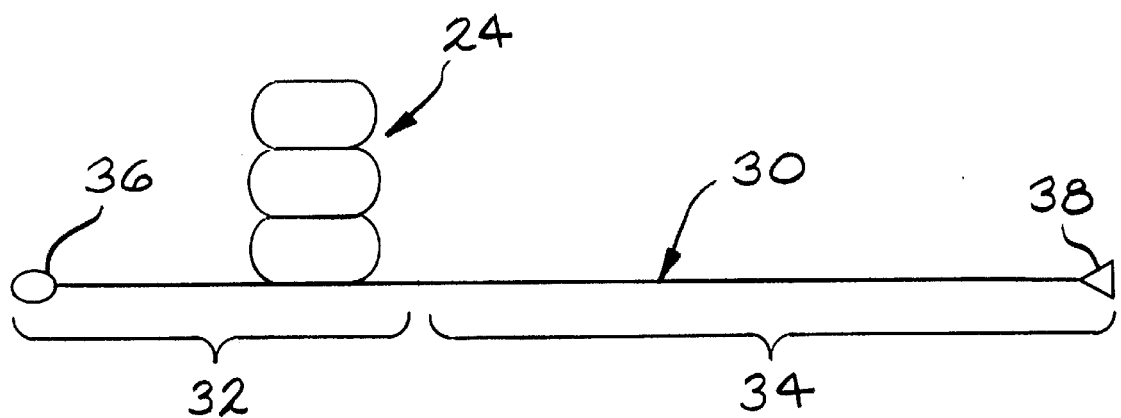
FIG. 5 illustrates the group of sleeve packages shown in FIG. 4 laid on top of the line in preparation for attaching the line to the unit according to the invention.

As shown in FIG. 5, the stack 24 of sleeve packages 18 can be placed on top of line 30, which is to be used to remove the sleeve packages from the transportation or storage container. The line 30 can be divided into two portions, the loop portion 32 and the extension portion 34. The loop portion is suitable for being wrapped or looped around the stack 24 of sleeve packages 18. The loop portion 32 preferably has a loop 36 at one end of the line 30. The loop 36 is useful in attaching the line 30 to the stack 24 of sleeve packages. The extension portion 34 of the line 30 preferably has a handle 38 suitable for use by a person unloading the truck or other container. The truck unloader can thus grasp the handle 38 on the line 30 and pulls the handle to remove the sleeve packages from the truck.

As shown in FIG. 6, the line 30 is wrapped or looped around the upper segment 40 (i.e., the top three sleeve packages 18) of group 44 of five sleeve packages. The group 44 is made by wrapping the line 30 around three sleeve packages, and then placing those three wrapped sleeve packages on top of two additional sleeve packages. The group 44 of sleeve packages 18 can be any number of sleeve packages that can be easily and economically stacked and moved into a truck or other container. Typically the group of sleeve packages for transport in a truck will contain from 2 to about 6 sleeve packages. While the upper segment 40 of the group 44 shown in FIG. 6 includes three sleeve packages, the number of sleeve packages 18 in the upper segment 40 can vary from only one sleeve package to all of the sleeve packages in the group. As a practical matter, the number of sleeve packages to be included in the upper segment 40 will be set so that after the truck unloader has pulled the line to remove the upper segment 40 from the truck, the remaining sleeve packages from the group will be at a height no higher than can be safely removed by the truck unloader standing on the ground. For example, the group 44 could include 5 sleeve packages 18, and the top 4 of the packages could be included in the upper segment 40 by having the line 30 looped around them.

The line 30 to be used for pulling the group 44 or upper segment 40 of the group out of the truck can be any elongated member having sufficient tensile strength for pulling the insulation out of the truck. Examples include rope, fiber reinforced bands, and webs. Ideally the line is flexible so that it can be readily looped around the sleeve packages and can be attached to itself or one or more of the sleeve packages. The attachment of the line 30 to the sleeve packages 18 can be accomplished by looping the line around the sleeve packages in the upper segment 44 and passing the line through the loop 36. This can be done with the loop coming up the side from the bottom of the upper segment, as shown in FIG. 6, or with the loop oriented across the top of the upper segment, as shown in FIG. 7. Alternatively, the line can be attached by any other attachment means, such as by using an anchor or adhesive, not shown. Where strapping or bands are used, a clip can be used to secure the loop portion 34 to the upper segment of the sleeve packages.

It is necessary for the line 30 to be attached substantially at the top of the group 44 of sleeve packages 18. The term "substantially at the top" means that the attachment point is either at the very top of the group or sufficiently high up on the upper segment 40 of sleeve packages that the upper segment can be readily tipped over by pulling on the line 30. At a minimum, because the upper segment 40 rotates about the bottom front edge 60 of the lowest sleeve package 18 when the group 44 tips over, the attachment should be substantially further from the edge 60 than is the center of gravity G of the upper segment 40. The attachment of the line 30 need not be a physical connection or contacting of the sleeve packages 18 in the upper segment 40, but can merely be the point where the line 30 passes through the loop 36. Preferably the line 30 is secured near the rear edge 46 of the top of the upper segment so that the line will be angled over or extended over the front edge 48 of the top of the upper segment when the line 30 is pulled out or extended as shown in FIG. 7.

As shown in FIG. 7, the truck 50, shown in a cutaway view, has a number of groups 44 of sleeve packages 18. Also, several groups can fit widthwise across the width of the truck. The loop portion 32 of the line 30 is wrapped around the upper segment 40 of the sleeve packages in the group 44. The extension portion 34 of the line 30 is being pulled by the truck unloader so that the three sleeve packages of the upper segment are being pulled out of the truck by being tipped over. The handle 38 makes it easier for the truck unloader to pull on the line. When the line 30 is pulled taut, as shown in FIG. 7, a free section 51 of the extension portion 34 of the line is oriented diagonally, extending from the front top edge 48 down to the handle 38. The free section 51 of the extension portion of the line should be long enough to allow the truck unloader to safely topple the upper segment 40. Preferably, the free section 51 is at least about 10 feet long, more preferably it is at least about 20 feet long, and most preferably it is at least about 25 feet long. This enables the truck unloader to stand safely away from the rear of the truck while pulling the line so that the truck unloader will be out of the path of the sleeve packages as they tumble out of the truck onto the ground. Another advantage in having a long free section 51 of the extension portion of the line is that it allows the truck unloader to be at a distance far enough away from the truck that the unloader can observe both sides of the truck. This is helpful because it enables the unloader to be sure that no other persons are coming around the end of the truck and into the path of the sleeve packages as they tumble to the ground.

As described above, the free section 51 of the extension portion 34 of the line 30 must have a significant length for safe unloading of the sleeve packages. In order to prevent entanglement and possible breaking of the line during the truck loading and the transportation of the insulation packages in the truck, a means of storing the extension portion 34 of the line is provided. This can be any means for preventing entanglement of the line, such as a gathering means or a storage means. A suitable gathering means would be a clip, not shown, to hold the line in a coiled or looped status. A suitable storage means would be a container, such as a bag, not shown or such as a pouch 52. The pouch 52 is preferably adhered to one of the sleeve packages 18. Most preferably, the pouch 52 is adhered to the lowest or bottom sleeve package of the stack or group 44 of packages, as shown in FIG. 6. Advantageously, the pouch 52 is provided with a peel-and-stick adhesive on its back so that it can easily be applied to any one of the sleeve packages. By positioning the pouch 52 on the bottom sleeve package, the truck unloader can easily see the pouch, and can reach the coiled extension portion 34 of the line and the handle 38 inside the pouch. Also, advantageously the front of the pouch can be provided with instructions for the truck unloader regarding the proper procedure to unload the upper segment 40.

After removing the coiled line from the pouch 52, the unloader pays out the free section 51 of the line until the unloader is at a safe distance behind the truck, and then pulls the line to cause the group 44 or upper segment 40 to fall from the truck. After the sleeve packages 18 in the upper segment are removed from the truck according to the method of this invention, the remaining sleeve packages in the group 44 at the rear of the truck can be removed manually by the truck unloader.

Although the invention is illustrated using packages of batts in bags, it is to be understood that sleeve packages can be formed using packages of insulation in the form of rolls, not shown. For example, the sleeve packages could be formed by placing four rolls in a first layer, in a 2×2 arrangement, and then adding a second layer of the same configuration on top of the first layer, to make a sleeve package having eight rolls of insulation, not shown. In such a case, a group 44 of sleeve packages would probably be made of two sleeve packages, and the upper segment would probably be the top sleeve package.

The principle and mode of operation of this invention have been described in its preferred embodiments. However, it should be noted that this invention may be practiced otherwise than as specifically illustrated and described without departing from its scope.

What is claimed is:

1. The method of placing compressed insulation material into a container for subsequent removal comprising:
   selecting a group of packages of compressed insulation material to be put into the container;
   attaching a line to the group, where the line is attached substantially at the top of the group so that at least an upper segment of the group can be pulled out of the container by pulling the line and tipping over the upper segment; and
   placing the group into the container.

2. The method of claim 1 where attaching the line includes looping the line around the upper segment.

3. The method of claim 2, wherein one end of the line includes a loop and said attaching step includes passing the line through the loop.

4. The method of claim 3, further including the steps of storing at least a portion of an extension portion of the line in a line container and attaching the line container to one of the packages.

5. The method of claim 4 in which the extension portion is at least 20 feet in length.

6. The method of claim 1 in which the group contains from 2 to about 6 packages of compressed insulation material.

7. The method of placing compressed insulation material into a container for subsequent removal comprising:
   substantially filling the container with packages of compressed insulation material;
   selecting a group of from 2 to about 6 packages of compressed insulation material to be the final packages to be put into the container;
   attaching a line to an upper segment of the group so that the upper segment is held together, where the line is attached to the upper segment substantially at the top of the upper segment so that the upper segment can be pulled out of the container by pulling the line and tipping over the upper segment;
   placing the group into the container; and
   closing the container.

8. The method of claim 7 wherein said attaching step includes looping the line around the upper segment.

9. The method of claim 8 wherein one end of the line includes a loop and said attaching step includes passing the line through the loop.

10. The method of claim 9 further including the step of storing at least a portion of an extension portion of the line in a line container and attaching the line container to one of the packages.

11. The method of claim 10 in which the extension portion is at least 20 feet in length.

12. The method of removing packages of compressed insulation material from a container, where the packages are stacked in the container in the form of a group of from 2 to about 6 packages:
   paying out a line attached substantially to the top of the group of packages; and
   pulling the line to cause at least an upper segment of the group to tip over and fall out of the container.

13. The method of claim 12, wherein the group of packages has a front top edge, and wherein said paying out step includes paying out the line a length of at least 20 feet from the front top edge of the group prior to the step of pulling the line.

14. The method of claim 12 wherein the line encircles the upper segment so that pulling the line during said pulling step causes the upper segment to tip over and fall out of the container.

15. The method of claim 12 wherein the line comprises a rope, the container is a truck, and the group of packages has a front top edge, and wherein said paying out step includes paying out the line a length of at least 20 feet from the front top edge of the group prior to the step of pulling the line.

16. The method of claim 15 wherein said paying out step includes paying out the line a length of at least 25 feet from the front top edge of the group prior to the step of pulling the line.

* * * * *